United States Patent
Chellappan et al.

(10) Patent No.: US 10,176,132 B2
(45) Date of Patent: Jan. 8, 2019

(54) CONFIGURATION ARBITER FOR MULTIPLE CONTROLLERS SHARING A LINK INTERFACE

(71) Applicant: Intel Corporation, Santa Clara, CA (US)

(72) Inventors: Satheesh Chellappan, Folsom, CA (US); Chunyu Zhang, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 14/757,830

(22) Filed: Dec. 26, 2015

(65) Prior Publication Data
US 2017/0185550 A1  Jun. 29, 2017

(51) Int. Cl.
G06F 13/37 (2006.01)
G06F 13/42 (2006.01)
G06F 1/12 (2006.01)
G06F 1/26 (2006.01)

(52) U.S. Cl.
CPC .............. *G06F 13/37* (2013.01); *G06F 1/12* (2013.01); *G06F 1/26* (2013.01); *G06F 13/4226* (2013.01)

(58) Field of Classification Search
None
See application file for complete search history.

(56) References Cited

U.S. PATENT DOCUMENTS

| | | | | |
|---|---|---|---|---|
| 5,581,782 A | * | 12/1996 | Sarangdhar | G06F 13/36 710/108 |
| 7,953,912 B2 | * | 5/2011 | Krishnamurthy | G06F 9/5061 345/502 |
| 2003/0032427 A1 | * | 2/2003 | Walsh | H04B 7/1858 455/428 |
| 2005/0091432 A1 | * | 4/2005 | Adams | G06F 13/4022 710/100 |
| 2008/0235707 A1 | * | 9/2008 | Gwilt | G06F 13/1615 718/107 |
| 2013/0208722 A1 | * | 8/2013 | Armstrong | H04L 45/44 370/392 |

(Continued)

OTHER PUBLICATIONS

International Search Report and Written Opinion dated Apr. 28, 2017 for International Application No. PCT/US2016/067046, 11 pages.

*Primary Examiner* — Elias Mamo
(74) *Attorney, Agent, or Firm* — Schwabe, Williamson & Wyatt, P.C.

(57) ABSTRACT

In a system where multiple controllers share a link interface but are not all (1) compatible with the same configuration of the physical layer or (2) using the same clocking, a configuration arbitration subsystem intercepts, organizes, and re-clocks configuration-access requests from the various controller agents. Priorities are assigned according to stored policies. The configuration arbiter grants configuration access to the top-priority agent, synchronizing the agent's message with the arbiter's clock. Lower-priority agents' messages are stored in command queues until they ascend to top priority. Besides preventing timing conflicts and streamlining the coordination of clocks, the configuration arbiter may provide access to physical-layer registers beyond the controllers' built-in capabilities to further optimize configuration.

8 Claims, 6 Drawing Sheets

(56) References Cited

U.S. PATENT DOCUMENTS

2014/0143486 A1* 5/2014 Chirca ............... G06F 13/1668
                                                    711/104
2016/0179707 A1* 6/2016 Chedda .............. G06F 13/1642
                                                    710/244

* cited by examiner

CONFIGURATION ARBITER FOR MULTIPLE CONTROLLERS SHARING A LINK INTERFACE

FIELD

Related fields include multi-controller computing architectures, and more particularly sharing link interfaces by diverse controller types.

BACKGROUND

Conventional system-on-chip devices include several controllers that access a common PHY (e.g., MPHY). These controllers are coupled to one or more data lanes and a shared common lane. Typically, the common lane provides configuration settings that need to be programmed. However, there may be a conflict if the various controller settings are using a shared MPHY register.

DETAILED DESCRIPTION

Some electronics manufacturers' goals include faster processing, optimal handling of larger collections of information, and fitting more diverse functionality into a smaller space. One approach is to have multiple controllers use the same communications link interface, be it Mobile Industry Processing Interface (MIPI), e.g., MIPI M-PHY, Universal Serial Bus (USB), Gigabit Ethernet (GbE), Peripheral Component Interconnect Express (PCIe), Serial Advanced Technology Attachment (SATA), or some other suitable type of link interface.

For example, a system-on-chip (SoC) may include multiple MIPI Controllers that access a common modular MIPI M-PHY (physical layer). An M-PHY may include multiple individual data lanes and a common lane. Phase-locked-loop (PLL) parameters and other configuration settings that need to be programmed uniformly for the entire link may be handled in the common lane. Some parameters of each individual data lane may be independently configurable. Resource conflicts or errors could occur if a controller tries to communicate on a link that is configured for a different controller, or if two controllers attempt to reconfigure the link at the same time. In addition, multi-partition clock balancing, with each partition allocated to a different controller clock, may become very complex for more than two partitions.

For each individual controller, the standard RMMI configuration interface defined by the MIPI M-PHY specification is addressable only to standard registers. Access to common registers, lane registers, or private M-PHY specific registers would provide more configuration flexibility, but is not yet provided in the standard specification. Other link types may present analogous obstacles.

Figure 1:
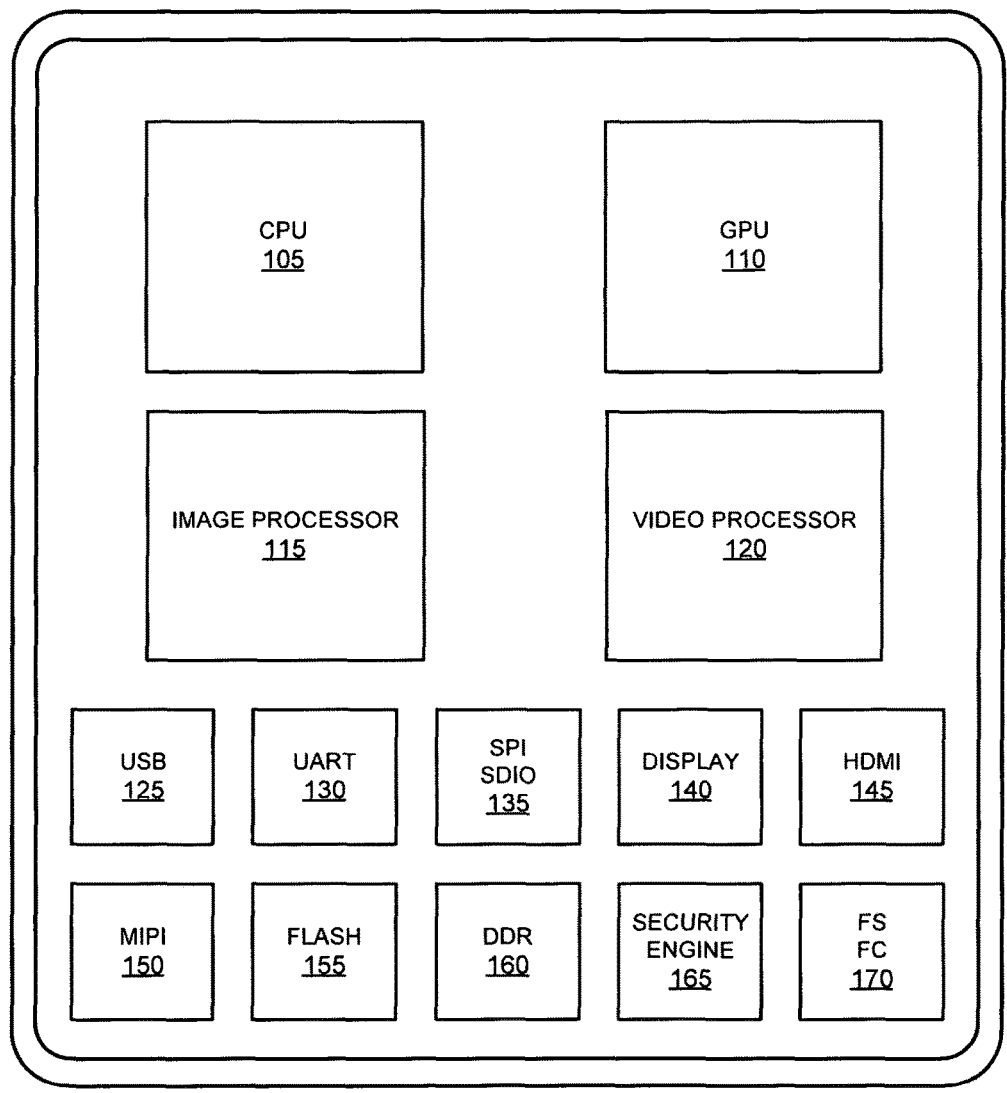
FIG. 1 is a block diagram of a multi-processor device.

FIG. 1 is a block diagram of a multi-processor device. The processor contains a central processing unit (CPU) 105 and a graphics processing unit (GPU) 110, which may perform at least one instruction in some embodiments. An instruction to perform operations could be performed by the CPU 105. Additionally or alternatively, the instruction could be performed by the GPU 110. In still another embodiment, the instruction may be performed through a combination of operations performed by the GPU 110 and the CPU 105. For example, in one embodiment, an instruction in accordance with one embodiment may be received and decoded for execution on the GPU 110. However, one or more operations within the decoded instruction may be performed by a CPU 105 and the result returned to the GPU 110 for final retirement of the instruction. Conversely, in some embodiments, the CPU 105 may act as the primary processor and the GPU 110 as the co-processor.

In some embodiments, instructions that benefit from highly parallel, throughput processors may be performed by the GPU 110, while instructions that benefit from the performance of processors that benefit from deeply pipelined architectures may be performed by the CPU 105. For example, graphics, scientific applications, financial applications and other parallel workloads may benefit from the performance of the GPU 110 and be executed accordingly, whereas more sequential applications, such as operating system kernel or application code may be better suited for the CPU 105.

The processor of FIG. 1 includes a CPU 105, GPU 110, image processor 115, video processor 120, USB controller 125, UART controller 130, SPI/SDIO controller 135, display controller 140, HDMI controller 145, MIPI M-PHY controller 150, flash memory controller 155, dual data rate (DDR) controller 160, security engine 165, and FS/FC controller 170.

Other logic and circuits may be included in the processor of FIG. 1, including more CPUs 105 or GPUs 110 and other peripheral interface controllers.

Communication interfaces such as USB controller 125, MIPI M-PHY controller 150, or HDMI controller 145 may be shared by two or more of the other controllers to communicate with other modules on the same chip, other chips, other boards, or other devices. With two or more of CPU 105, GPU 110, image processor 115, and video processor 120 processing data in parallel and frequently calling on, e.g., display controller 140 and flash memory controller 155, those controllers in turn may need to frequently reconfigure and use the communication interfaces. Meanwhile, security engine 165 may need to constantly monitor and authenticate traffic on the communication interfaces.

Figure 2:
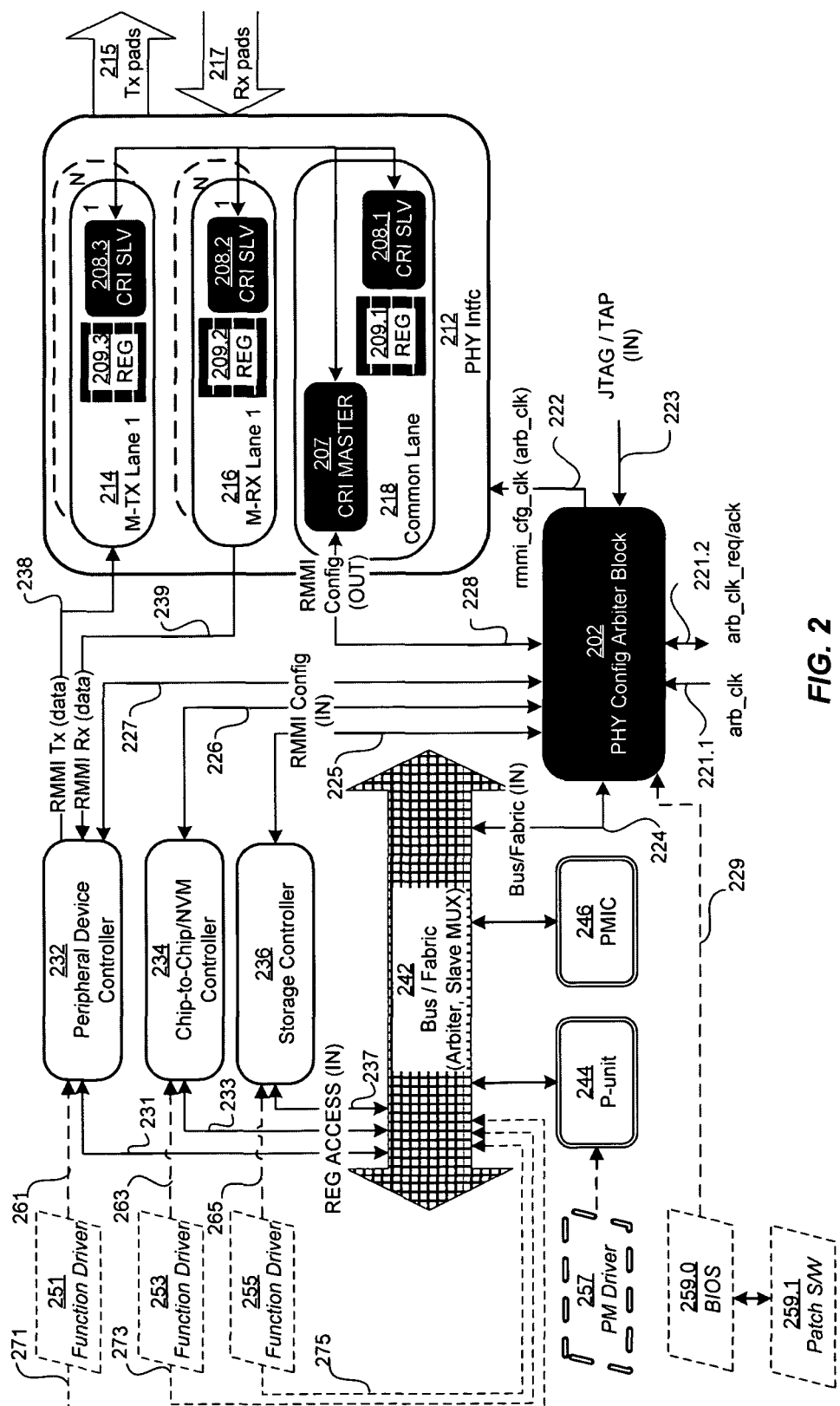
FIG. 2 is a block diagram of a configuration arbitration subsystem installed in a host system.

FIG. 2 is a block diagram of a configuration arbitration subsystem installed in a host system. The white blocks represent standard system blocks found in, e.g., MIPI M-PHY infrastructure. These are the existing blocks that may couple to, interact with, or illustrate context for the configuration arbitration components. Physical-layer interface 212 includes N transmitter lanes 214 coupled to transmitter pads 215, N receiver lanes 216 coupled to receiver pads 217, and a common lane 218. The illustrated physical-layer interface 212 is based on MIPI M-PHY. Alternative physical layers may lack a common lane 218 or may even be a single serial data path rather than multiple lanes, but nevertheless may support a straightforward adaptation of configuration arbitration. The host system may also include two or more controllers using different protocols and/or different clocks. Controllers 232, 234, and 236 in the MIPI M-PHY may use any standard protocol and may include Universal Flash Storage (UFS) or some other non-volatile memory controller, Samsung 3-core 400 MHz MEX® or some other solid-state drive (SSD) or other storage controller, Super-Speed USB Inter-Chip (SSIC) or some other peripheral-device controller, Unified Protocol (UniPro) or some other chip-to-chip communication controller, or any other controllers compatible with components of the surrounding system.

Blocks with dashed outlines represent software or firmware. Function drivers 251, 253, and 255 manage the configuration and functional operation of controllers 232, 234, and 236 through driver-to-controller connections 261, 263, and 265, respectively. In some embodiments, one or more of the function drivers 251, 253, or 255 may directly interface with physical-layer (e.g., M-PHY) registers through PHY interface 212 in the absence of configuration arbitration. Alternatively, in some embodiments (including the example illustrated here), only the controllers 232, 234, and 236 may directly interface with physical-layer registers in systems without configuration arbitration.

Requests for configuration access to physical-layer interface 212 from controllers 232, 234, and 236 or from software/firmware drivers 251, 253, and 255, instead of being routed through the RMMI transmit portion 238 and receive portion 239 like data exchanged after the physical layer has been configured, may be diverted to the configuration arbiter controller (i.e., configuration arbiter block 202) through the respective arbiter interfaces 225, 226, and 227 and treated as agents by configuration arbiter block 202.

The black blocks represent configuration arbitration components common to some embodiments that may be flexibly implemented in a variety of device types. Configuration arbitration may be adapted for use almost anywhere a link interface or any other component is shared by two or more controllers that impose different configurations on the shared component and/or use different clock sources. The underlying schema may be adapted for system-on-chip (SoC), multi-chip systems, or macroscopic devices connected by wired or wireless networks.

The configuration arbiter block 202, rather than the physical-layer interface 212, becomes the immediate destination for physical-layer configuration access requests from the multiple platform agents. As these requests are received, configuration arbiter block 202 uses access policies to manage the agents' access to one or more of the common, lane, or private registers 209.1, 209.2, or 209.3 of a configuration register set associated with physical-layer interface 212. The configuration arbiter block 202, the Common Register Interface (CRI) master 207, and its CRI slaves 208.1, 208.2, and 208.3 interact to ensure that each agent is granted configuration access, finishes its physical-layer configuration process, and triggers its source to send and/or receive all of its required data before any other agent is allowed to change the configuration or write to common, lane, or private registers 209.1, 209.2, or 209.3 of the configuration register set.

The configuration arbiter block 202 includes internal control and status registers (shown explicitly in FIG. 3) that can be used by power management (PM) driver 257 (or directly by BIOS 259.1.1) to manage the access policies for SoC systems of differing designs and/or in different surrounding environments. During a boot process, BIOS 259.1 can set the access policies and, if applicable, their priorities. At a later date, one or more software updates or patches 259.2 may add, subtract, or change policies. To prevent unauthorized edits of policies or register values, a secure boot agent associated with BIOS interface 229 may define a Security Attribute of Initiator (SAI) that must be authenticated for agents requesting access to physical-layer registers 209.1, 209.2, or 209.3 of the configuration register set.

An example of an agent-priority access policy that may be used by configuration arbiter block 202 could be, in descending order: (1) BIOS 259.1 for access-policy updates, (2) PMIC 246 for power distribution in FIG. 2's SoC, (3) P-unit 244 for power requests and acknowledgments from other components of the SoC to be sent through physical-layer interface 212, (4) PM driver 257 for power-policy updates, (5) function drivers 251, 253, or 255 for coordinating physical-layer configuration access for controllers 232, 234, or 236 respectively, (6) controller protocol agents for managing states such as Mode, Rate, or Suspend (e.g., Hibern8) of one or more state machines, and (7) Joint Test Action Group/Test Access Port (JTAG/TAP) input 223 for debugging and "Design for X" (DfX) validation.

In some embodiments, an access policy may grant controller agents from function drivers 251, 253, and 255 equal "round-robin" configuration access. Alternatively, an access policy may grant controller agents from function drivers 251, 253, or 255 weighted priorities for configuration access.

In some embodiments, the configuration requests from controllers 232, 234, and 236 are routed to configuration arbiter block 202 as modular-interface (e.g., standard RMMI) messages compatible with physical-layer interface 212. In these cases, configuration arbiter block 202 may only need to provide clock-domain crossings to synchronize the signals to the arb_clk arbiter clock 221.1.

Bus or fabric 242 may include, e.g., AMBA® Advanced High-Speed Bus (AHB), Primary Scalable Fabric (PSF), or any other generally applicable data bus or system fabric. The controllers 232, 234, and 236 may have controller-to-fabric connections 231, 233, and 237, respectively. Besides or instead of direct driver-to-controller connections 261, 263, and 265, function drivers 271, 273, and 275 may use driver-to-fabric connections 271, 273, and 275 to communicate with controllers 232, 234, and 236 through controller-to-fabric connections 231, 233, and 237, respectively.

Access requests that come from the bus or fabric 242 through the fabric/bus interface 224 may not be understandable by physical-layer interface 212 without some kind of conversion beyond clock-domain crossing. For example, the requests may come in as memory-write (MemWr) or memory-read (MemRd) messages. The configuration arbiter block 202 may convert them to modular-interface messages or some other type of message compatible with physical-layer interface 212 (as well as re-clocking them if needed) before hooking them to a downstream attach point in configuration arbiter block 202 for output through CRI Master interface data link 228.

Similarly, configuration arbiter block 202 may convert configuration access requests from the JTAG/TAP interface 223 to modular-interface messages or some other type of message compatible with physical-layer interface 212. The JTAG TAP may be a specialized port accessible from the exterior of the system. Some debugging and DfX validation processes may require the component under test to be unburdened by any extraneous traffic. In some embodiments, configuration arbiter block 202 may block or temporarily buffer access requests from other functional input agents while JTAG/TAP interface 223 is active.

The double-lined blocks represent configuration arbitration components that may be useful in, for example, some SoC embodiments.

The P-unit 244 is a hardware agent managed by a software agent, namely the PM driver 257. The P-unit 244 may manage the SoC power requests and acknowledgement signals exchanged between controllers (e.g., one or more MIPI M-PHY controllers 232, 234, and 236) and the physical layer interface 212 (e.g., M-PHY). The PM driver 257 may manage power flow among the components of the SoC according to one or more power policies. For example, in a MIPI M-PHY infrastructure, the PM driver 257 may manage the device-power states of any or all of the MIPI M-PHY controllers 232, 234, and 236, and may access the common register(s) 209.1 where it may reconfigure power settings, clock settings, or both.

Another component frequently found in SoCs, the power-management integrated circuit (PMIC) 246 may control power delivery to the entire SoC including the physical-layer interface 212 and its lanes 214, 216, and 218. For example, the PMIC 246 may enable the SoC platform to continue managing power in the lanes 214, 216, and 218 during platform-power overrides.

In some embodiments, configuration arbiter block 202 may provide access to lane or private registers 209.2 and 209.3 for the P-unit 244 and/or the PM driver 257 and/or the PMIC 246, including direct and high-priority access when needed. Without configuration arbitration, these power-controlling components may not have direct or quick access to these registers.

In some embodiments, configuration arbitration is transparent to the standard power flows in its host system and/or imposes no significant additional power-consumption burden. In embodiments where physical-layer configuration access is a gated-domain function, the power to configuration arbiter block 202 can be gated (i.e., shut off) when it is not being used. In some embodiments, configuration arbiter block 202 is unused during low-power system states such as state D3 of the Advanced Configuration and Power Interface (ACPI) system-level (Sx) states. Provided that the controllers only need physical-layer access during active states such as state D0 of the ACPI Sx states, configuration arbiter block 202 does not require an always-on (AON) domain or the ability to save states through periods of deactivation. On the other hand, registers storing access policies or control and configuration context of the configuration arbitration sub-system may need those values retained during periods when power to configuration arbiter block 202 is gated (PG states). In some embodiments, configuration-arbitration policy and context registers may reside in an AON or SUS (suspended-state) power well along with other selected control registers, while the other configuration arbitration components reside in the PG power well to be gated when not in active use.

Within the physical-layer interface 212, all the common, lane, or private registers 209.1, 209.2, and 209.3 of the configuration register set may use the same module-interface (e.g., RMMI) configuration clock accessible through configuration clock interface 222. The common register clocking simplifies physical-layer interface 212. The single RMMI configuration interface (transmit) 238 and (receive) 239 may be routed to multiple targets that may include common, lane, or private registers 209.1, 209.2, and 209.3 of the configuration register set. A generic register interface such as CRI may be used by a CRI master 207 to initiate access events and one or more CRI slaves 208.1, 208.2, or 208.3 as targets for the access events. In alternative embodiments, data lane groups 214 and 216 may have their own CRI Masters while the illustrated CRI Master 207 controls common-lane CRI slave 208.1.

The clocking architecture for messages in CRI master interface 207 is simplified by using arb_clk 221.1 as both a reference clock for configuration arbiter block 202 and a source of rmmi_cfg_clock 222 for physical-layer interface 212. Preferably, arb_clk 222.1, and rmmi_cfg_clock 222 may meet all the host system's gated-clock requirements and have a frequency that is equal to or greater than the highest frequency among the input agent configuration clocks including the clock used by the bus/fabric 242 if configuration arbiter block 202 has a bus/fabric interface 224. The arb_clk 221.1 signal may originate in a crystal clock in the host system or as an auxiliary clock from a dedicated clock control unit (CCU). Because the arb_clk 221.1 and its request/acknowledgment interface arb_clk seq/aca 221.2 are only needed when the configuration arbiter block 202 is running, i.e., during active states such as state D0 of the ACPI Sx states, the clock can reside in the same PG power well as the configuration arbiter block 202.

In summary, configuration arbiter block 202 may act as a central controller that diverts, organizes, prioritizes, re-clocks, and sends configuration-access messages to the physical layer in an order set by stored policies that can be tailored to specific devices and/or tasks. The common sequence provided by the configuration arbiter block 202 may be set, for example, from BIOS 259.1, PM driver 257 or PMIC 246. The arbiter's reach may be extended to all the registers in the physical-layer space. This design approach simplifies the integration of multiple, diverse IP types in systems of various scales, and also enables significant streamlining of the start-up software sequence. Moreover, because the configuration arbiter block 202 shows a single consistent module-interface clock to the physical-layer interface 212, there is no need for external balancing of the various controller clocks.

Figure 3:
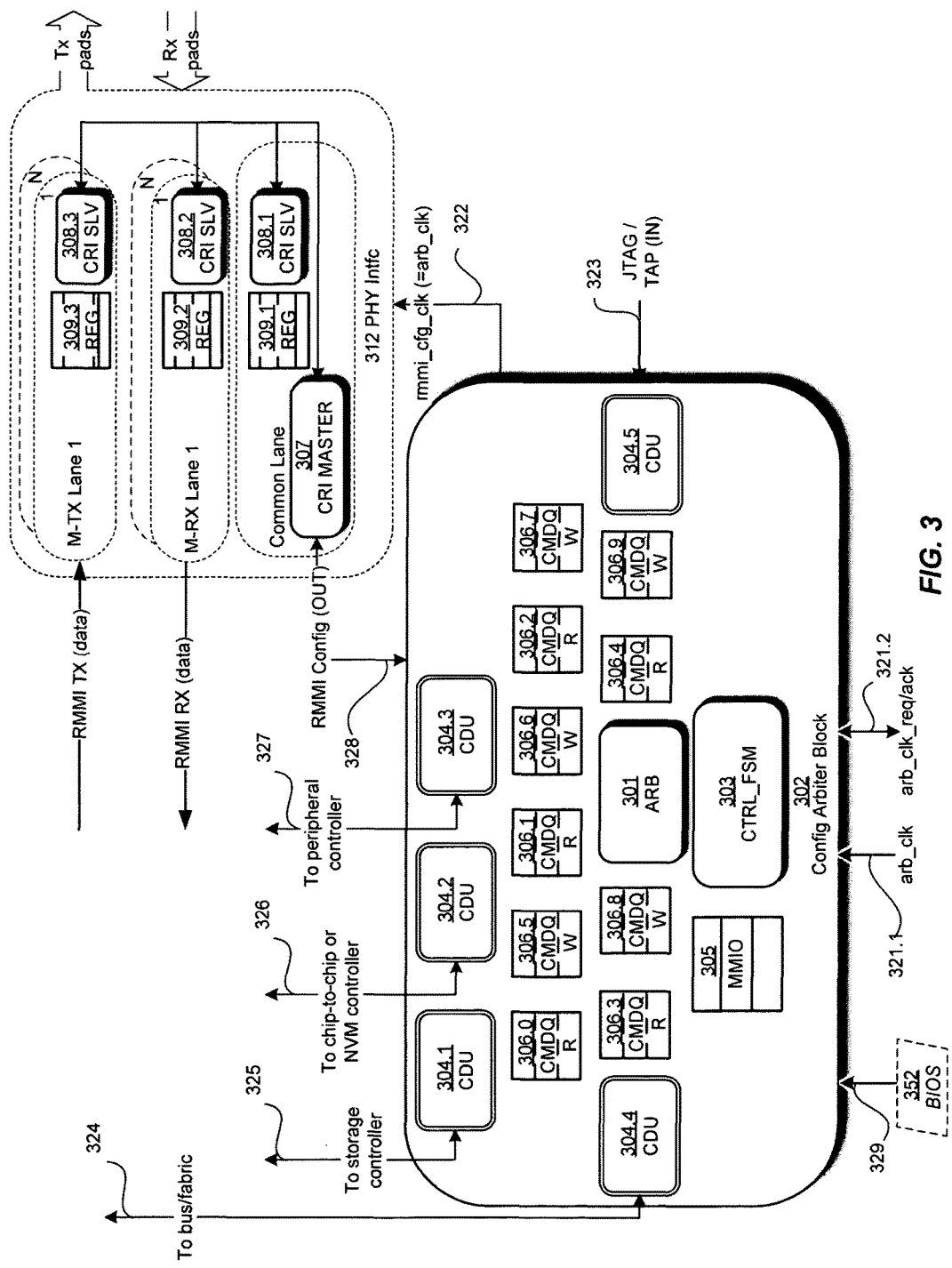
FIG. 3 is a block diagram of the configuration arbiter block and associated parts of the link interface.

FIG. 3 is a block diagram of the configuration arbiter block and associated parts of the link interface. The configuration arbiter block 302 may be connected to a peripheral or system fabric through a fabric bus connection 324 and may include the arbiter 301, the command queues (CMDQs) 306.0-306.9, Clock Domain Units (CDUs) 304.1-304.5, and one or more memory mapped input/output (MMIO) registers 305. The configuration arbiter block 302 may receive inputs from the input agents of all controllers that initiate configuration access. The configuration arbiter block 302 may provide output to the output agent for the physical-layer configuration interface 312 (e.g., M-PHY configuration interface). The clock for the configuration arbiter block 302 may be arb_clk 321.1, a suspend clock that remains available during system-low power mode. The configuration arbiter block 302 may draw power from a suspend power well or always-on (AON) power well, which remains powered during system suspended states such as Sleep or Hibernate.

Requests from external sources such as the JTAG/TAP input 323 may have formatting differences from modular-interface (e.g., RMMI) access messages. In some embodiments, the arbiter 301 converts all types of incoming requests to modular-interface access messages, so the CRI master and/or CRI slaves only need to be sophisticated enough to process modular-interface access messages. Additionally, the arbiter 301 may manage input priorities based on an access policy set in the Memory-Mapped Input/Output (MMIO) register(s). Round-robin or weighted-priority access policies, or any other suitable access policies, may be included. Each input agent may be assigned a requester ID associated with a priority, and the order in which the arbiter 301 grants access to the input agents may be based on the priority associated with the ID. Any non-empty command queue 306.0-306.9 may trigger a request to the arbiter 301. In some embodiments, priorities may be associated with the command queues 306.0-306.9 based on their status, with the highest priority going to the command queues 306.0-306.9 that are closest to being full.

The controller finite state machine (CTRL_FSM) 303 may manage the access control and/or other aspects of a power-on or power-off sequence. The access control is required to provide Security Attribute of Initiator (SAI) checks for security. For example, the power-on sequence may ensure that physical-layer private and common-lane registers are initialized by BIOS 352, which is accessible through BIOS connection 329. The power-off sequence may ensure that all overrides are released before the physical layer is powered down.

The CDUs 304.1-304.4 may be generic blocks that handle the asynchronous clock crossings from the configuration clock signals in the controller data inputs to the arbiter clock. For example, signals coming in from JTAG/TAP interface 323, storage interface 325, chip-to-chip/NVM controller interface 326, or peripheral controller 327 may all be clocked differently when they reach the arbiter 301, but when they exit the arbiter 301 they are synced to a common arbiter clock signal arb_clk 321.1. An arb_clk request/ acknowledgment connection 321.2 may also be provided. In some embodiments, arb_clk 321.1 may run at a higher frequency than any of the input agents' clocks to ensure that none of the access requests are lost.

The MMIO register 305 is a control and status register that may, in some embodiments, provide configuration and override controls. Software may be enabled to assign priorities to input agents of various controllers in the system by programming the MMIO register. To mitigate security risks, the control settings may be assigned by the system BIOS 302 and the access to the MMIO register 305 may be locked.

The command queues 306.0-306.9 may be generic queues that hold the write or read commands for configuring the physical layer. Each of the command queues 306.0-306.9 may be required to hold its next command until the arbiter grants access. The depths of command queues 306.0-306.9 may be configurable according to the rates of access requests from input agents. In some embodiments, configuration-access requests may be most frequent during initializations and power-state transitions. By contrast, there may be few or no configuration-access requests while the physical layer protocol (e.g., MIPI M-PHY) is functionally operating to communicate with a remote device. If the configuration cycles are not latency-critical events, they may be initiated sequentially. As illustrated, command queues 306.0-306.4 contain "write" commands and command queues 306.5-306.9 contain "read" commands, but in some embodiments "read" and "write" commands may both reside in the same command queue.

The Common Register Interface (CRI) Master 307 may be coupled to the physical layer (e.g., M-PHY) and interface through CRI Master interface data link 328 with the configuration arbiter block 302 and the common, lane, or private registers 309.1-309.3 of the configuration register set. The functions of the CRI Master 307 may include converting modular-interface (e.g., RMMI) messages to CRI messages and routing access messages destined for the configuration register set 309.1-309.3 to corresponding CRI Slaves 308.1-308.3. Access messages passed to and from the CRI Master 307 may be sequential. The selection of which CRI Slaves 308.1-308.3 will receive a particular access message may be determined by an address range included in the access message. Address mapping for common registers, lane registers, and private registers 309.1-309.3 of the configuration register set may be based on the number of lanes, including the common lane, in the physical layer. On-board storage coupled to the CRI Master 307 may be optional in some embodiments.

A CRI Slave 308.1-308.3 may be the termination of a register interface for any or all register banks in the physical-layer configuration interface 312, including without limitation common-lane register 308.1, data-lane registers or private registers 308.2 and 308.3, and private registers located elsewhere in physical-layer configuration interface 312. In some embodiments, there may be more CRI slaves "308.x" coupled to lane registers or private registers "309.x" (not shown explicitly), one for each transmit lane 1-N and corresponding receive lane 1-N.

The configuration register set 309.1-309.3 may contain two copies of some values, referred to as an "effective copy" and a "shadow copy." In some embodiments, some "read-to-register" processes may originate in the effective copy (i.e., the effective copy of the register value is read) and some "write-to-register" processes may terminate in the shadow copy (i.e., the shadow copy of the register value is overwritten). A configuration update may copy the content of the shadow copy into the effective copy. The CRI Slaves 308.1-308.3 may receive write commands incorporated in incoming access messages and perform the writes to shadow copies in their connected register banks.

The CRI Slaves 308.1-308.3 and the CRI Master 307 may clock synchronously with the rmmi_config_clk modular-interface clock signal 322. In some embodiments, the rmmi_config_clk modular-interface clock signal 322 may be the same as the arb_clk 321.1 arbiter clock signal.

Policies may be simple or flexible. For example, a simple policy might give any request from the peripheral controller interface 327 priority over any request from the storage controller interface 325. By contrast, a flexible policy might call out a first set of request types for which the peripheral controller interface 327 has priority over any request from the storage controller interface 325 and a second set of request types for which the priority is reversed.

Figure 4:
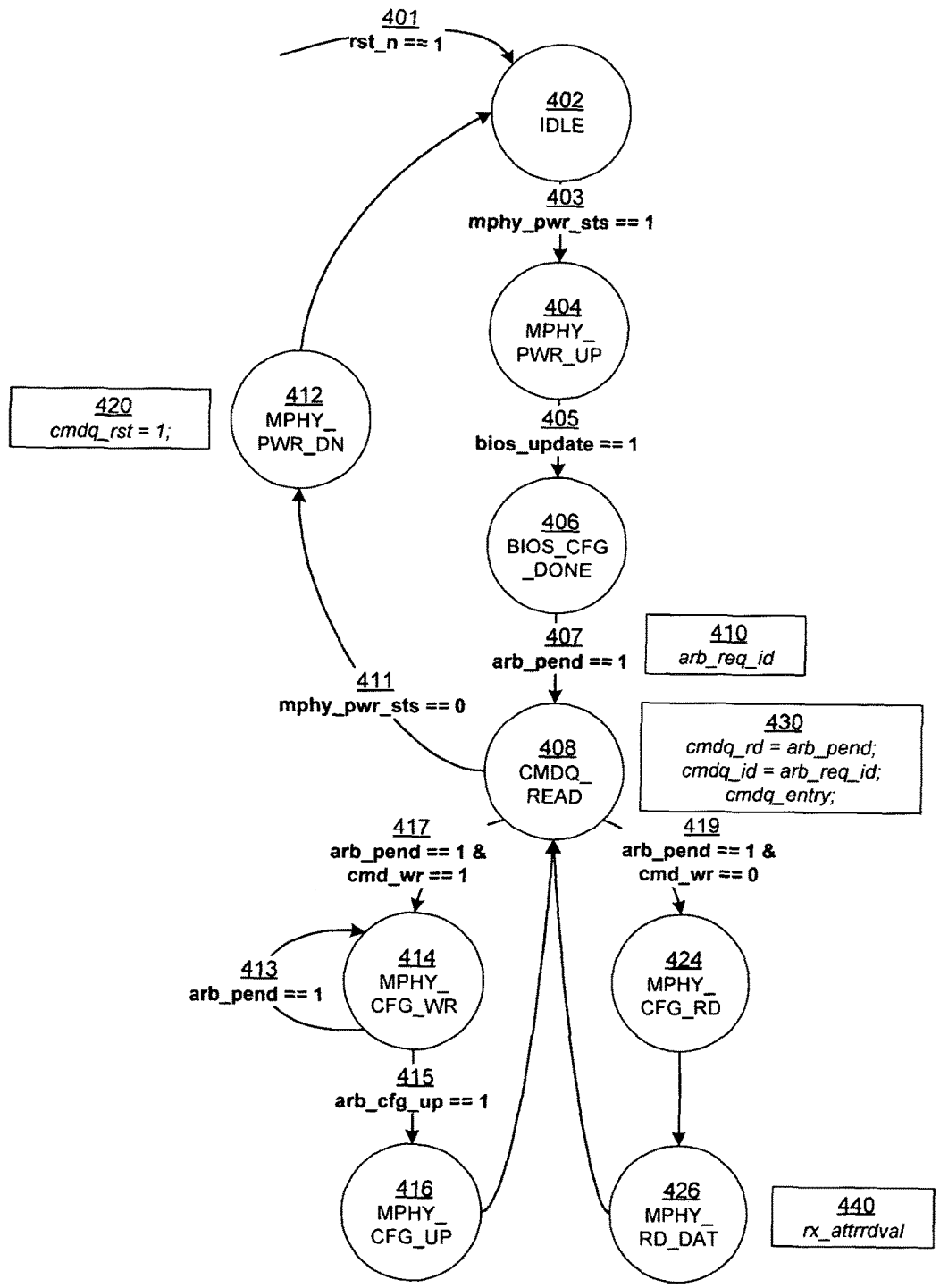
FIG. 4 is a state diagram for the state machine controlling a configuration arbiter.

FIG. 4 is a state diagram for the state machine controlling a configuration arbiter. When input signal 401 (rst_n==1, indicating a power-on reset) is sent to the configuration arbiter, the state machine changes its state to IDLE state 402, a default state selected to follow a power-on reset. When input signal 403 (mphy_pwr_sts==1, indicating that the M-PHY is receiving full operational power) is sent from the M-PHY to the configuration arbiter, the state machine changes its state to MPHY_PWR_UP state 404, in which the M-PHY power status is updated to reflect the M-PHY's being powered up.

When input signal 405 (bios_update==1, a signal from a particular register bit that changes when BIOS configuration is complete) is sent from the MMIO registers to the state machine, the state machine changes its state to BIOS_CFG_DONE state 406, in which the MMIO registers are updated in status to reflect the completion of BIOS initialization that triggered the bios_update signal 405. When the configuration arbiter sends signal 407 (arb_pend==1, indicating a pending command derived from applying its priority policies) to the state machine, the state machine outputs signal 410 (arb_req_id, the ID of the input request agent that was granted configuration access to send the pending command). In a further response to arb_pend==1 input signal 407, the state machine changes its state to CMDQ_READ state 408, a default configured state of waiting for commands from the configuration arbiter. Upon entering CMDQ_READ state 408, the state machine produces a set 430 of three output signals: cmdq_rd=arb_pend, cmdq_id=arb_req_id, and cmdq_entry. The output signal cmdq_rd=arb_pend; is an instruction to read a pending command from a command queue. The output signal cmdq_id=arb_req_id; specifies that the relevant command queue is the one allocated to the requester matching the latest output ID. The output signal cmdq_entry; indicates that the pending command has been read.

From state 408 (CMDQ_READ, the default configured-awaiting-commands state), the state diagram divides into three branches. Input signal 417 (arb_pend==1 & cmd_wr==1) may trigger a transition to state 414 (MPHY_CFG_WR, in which the state machine writes to one or more M-PHY registers to reconfigure them for the requester that has been granted access); to state 424 (MPHY_CFG_RD, in which the state machine reads a current value in one or more M-PHY registers); or to state 412 (MPHY_PWR_DN, a powered-down state with all command queues flushed, for example in a gated-power system).

If the command at the front of the command queue is a write command: The combination 417 of input signals arb_pend==1 and cmd_wr==1 may trigger a transition from state 408 (CMDQ_READ, the default configured waiting state) to state 414 (MPHY_CFG_WR, in which the state machine writes new RMMI configuration parameters to M-PHY registers). While the input signal 413 (arb_pend==1, indicating that at least one unexecuted command remains in the command queue) persists, the state machine remains in state 414 (MPHY_CFG_WR), ready to write more RMMI configuration parameters to M-PHY registers. This feature makes it possible to execute multiple configuration-write operations in a type of batch mode. The configuration arbiter excludes any agent except the granted configuration-access requester from accessing the M-PHY until all the granted requester's configuration-writes are complete).

When input signal 415 (arb_cfg_up==1, indicating a configuration update following the completion of the write operation(s)) is sent from the arbiter to the state machine, the state machine changes its state to MPHY_CFG_UP state 416, in which the RMMI configuration update received from the command queue has been instantiated in the M-PHY and the state machine produces output signal 420 to indicate a reset of the command queue (or, in some embodiments, to all the command queues). In the illustrated embodiment, the default exit state after resetting the command queue(s) is state 408, CMDQ_READ, waiting for the next from the configuration arbiter. The state machine automatically transitions from state 416 (MPHY_CFG_UP, M-PHY configuration updated according to the most recent command queue) to state 408 (CMDQ_READ, in which it waits for its next command from the configuration arbiter.).

If the command at the front of the command queue is a read command: The combination 419 of input signals arb_pend==1 and cmd_wr==0 may trigger a transition from state 408 (CMDQ_READ, the default configured waiting state) to state 424 (MPHY_CFG_RD, in which reading of the RMMI configuration is enabled according to the command from the queue). Read operations may be serialized; after a single read operation the state machine automatically transitions from state 424 (MPHY_CFG_RD to enable reading of the requested register) to state 426 (MPHY_RD_DAT, a clocked wait state). After outputting signal 440 (rx_attrrd-val, the value(s) that were read from the M-PHY register(s), the state machine automatically transitions from state 426 (MPHY_RD_DAT, the clocked wait state) back to state 408 (CMDQ_READ) to execute the next read command in the queue, if there is one, or to wait for the next configuration-access command from the configuration arbiter). Alternatively, the read operations may be executed as a batch, similarly to the write operations.

If power is gated or M-PHY otherwise deactivates: When input signal 411 (mphy_pwr_sts==0, indicating an inactive M-PHY such as during a system sleep or hibernate state) is sent from the M-PHY to the configuration arbiter, the state machine changes its state to MPHY_PWR_DN state 412, the power-down state where all the command queues are flushed. After outputting signal 420 (cmdq_rst==1 to reset the command queue(s)), the state machine automatically transitions from state 412 (MPHY_PWR_DN, the powered-down state) to state 402 (IDLE, a default power-on reset state).

Figure 5:
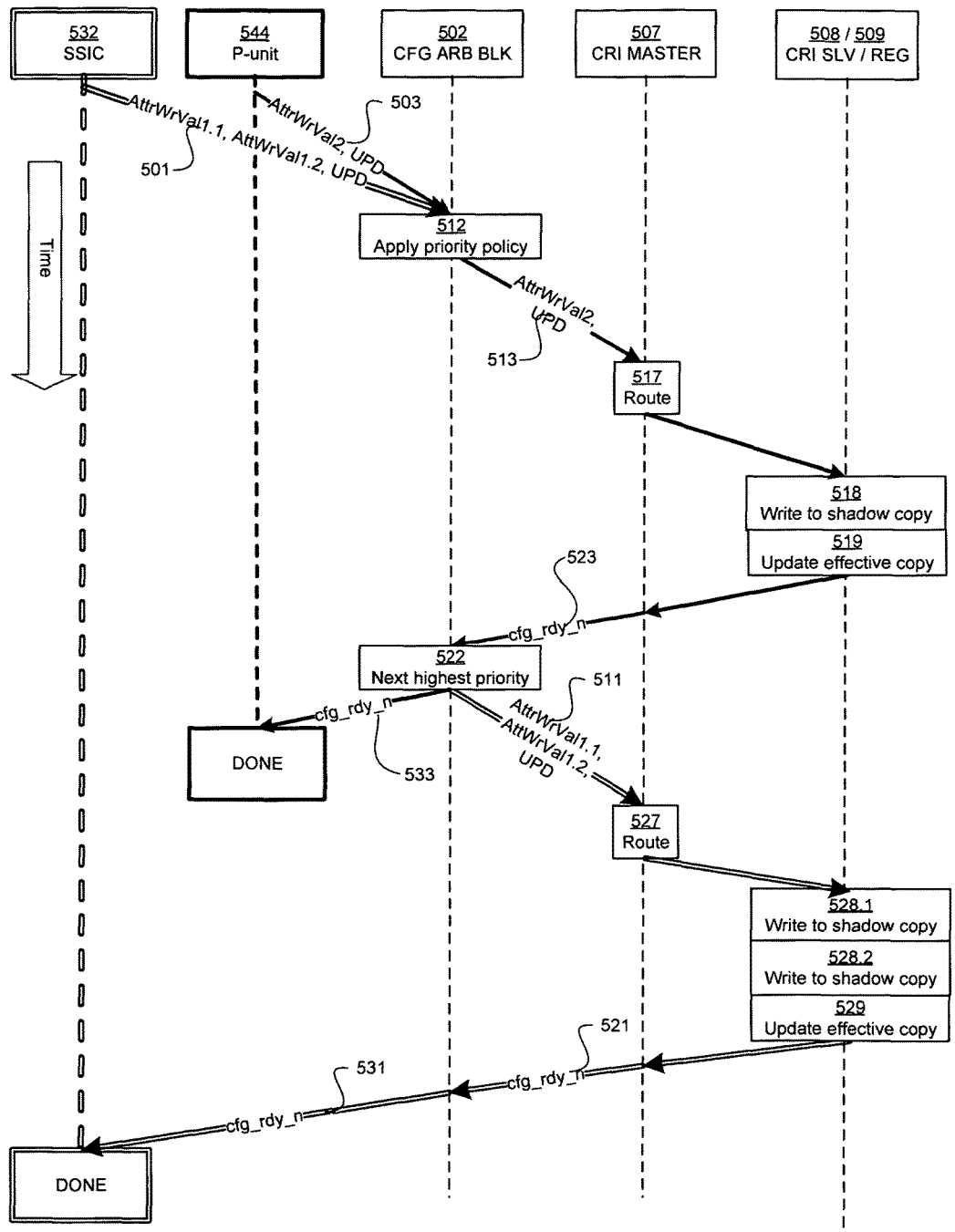
FIG. 5 is a message flow for a pair of write operations that are prevented from conflicting by configuration arbitration.

FIG. 5 is a message flow for a pair of write operations that are prevented from conflicting by configuration arbitration. In this example, the arbitration is between access requests from SSIC controller 532 and P-unit 544. Messages originating in the SSIC controller 532 are attached to double-line arrows with reference numbers ending in 1. Messages originating in the P-unit 544 are attached to single-line arrows with reference numbers ending in 3. Time for the message flow sequences increases from the top to the bottom or the page, but is not purported to be scaled or uniform.

Beginning at the earliest time at the top of the page: An SSIC request 501 for configuration access is sent from the SSIC controller 532 to the configuration arbiter block 502. SSIC request 501 includes two configuration writes, AttrWrVal1.1 and AttrWrVal1.2, followed by a physical-layer update UPD. A P-unit request 503 for configuration access is sent from the P-unit 544 to the configuration arbiter block 502. P-unit request 503 includes one configuration write, AttrWrVal2, followed by a physical-layer update UPD. SSIC request 501 and P-unit request 503 arrive at the configuration arbiter block 502 at approximately the same time.

The configuration arbiter block 502 performs task 512 of applying the relevant priority policies to the incoming requests 501 and 503. In this example, the policy assigns the P-unit request 503 a higher priority than the SSIC request 501. Accordingly, the configuration arbiter block 502 stores SSIC request 501 in a command queue (either a generic queue or one assigned exclusively to write-type commands). Storing stalled requests from lower-priority agents in the command queue prevents their loss while they wait for the physical layer to become free.

The P-unit request 503 is granted configuration access first; configuration arbiter block 502 sends the configuration content AttrWrVal2 and UPD on to CRI master 507 as message 513. If P-unit request 503 arrived at configuration arbiter block 502 already in a form executable by CRI master 507 and CRI slave 508, message 513 may be identical to P-unit request 503; if not, message 513 may be a translation or reformatting of P-unit request 503. CRI master 507 reads a destination indicator in message 513 and performs task 517, routing message 513 to the particular CRI slave 508 that handles the corresponding register bank 509. CRI slave 508 performs task 518, writing AttrWrVal2 to the shadow copy of register bank 509. The update command UPD (e.g., a config_update cycle of an M-PHY)

triggers task 519, updating the effective copy of register bank 509 to match the newly altered shadow copy.

After the update, the physical layer sends confirmation 523, e.g., cfg_rdy_n, to report that the physical layer is configured according to the last-sent request. CRI slave 508 and CRI master 507 pass the confirmation 523 to the configuration arbiter block 502. The configuration arbiter block 502, having retained information about the requester of the latest configuration write, sends confirmation 533 to P-unit 544. If confirmation 523 arrived at configuration arbiter block 502 already in a form readable by P-unit 544, confirmation 533 may be identical to confirmation 523; if not, confirmation 533 may be a translation or reformatting of confirmation 523. This concludes the instant interaction of P-unit 544 with configuration arbiter block 502; P-unit 544 may now interact directly with the newly-configured physical layer to communicate with other components, chips, boards, or devices.

Meanwhile, configuration arbiter block 502 reads all its command queues, checks for any new requests, and performs task 522 of applying its policies to assign priorities. In some embodiments, configuration arbiter block 502 may assign one or more dedicated command queues to each individual agent that may request access—e.g., each agent has a read queue and a write queue, or each agent has a mixed queue for both reads and writes. In this arbitration round, SSIC request 501 has risen to top priority. As before, configuration arbiter block 502 stores the second-and-lower-priority requests in command queues if they are not already stored, retrieves the top-priority request, namely SSIC request 501, from the command queue(s), and sends the content (AttrWrVal1.1, AttrWrVal1.2, and UPD) to CRI master 507 as message 511 (which may or may not be identical to SSIC request 501).

CRI master 507 reads a destination indicator in message 511 and performs task 527, routing message 511 to the particular CRI slave 508 that handles the corresponding register bank 509. (For simplicity and clarity this diagram shows only one CRI slave 508 and one register bank 509 handled by the CRI slave 508, but in practice there may be many slaves, each handling many register banks. The multiple register banks may be of different types or categories, or may affect multiple lanes. For example, AttrWrVal1.1 and AttrWrVal1.2 might in some embodiments be written to different register banks handled by the same CRI slave, or different register banks handled by different CRI slaves). CRI slave 508 performs task 528.1 (writing AttrWrVal1.1 to the shadow copy of register bank 509), and task 528.2 (writing AttrWrVal1.2 to the shadow copy of register bank 509). The update command UPD (e.g., a config_update cycle of an M-PHY) triggers task 529, updating the effective copy of register bank 509 to match the newly altered shadow copy.

After the update, the physical layer sends confirmation 521, e.g., cfg_rdy_n, to report that the physical layer is configured according to the last-sent request. CRI slave 508 and CRI master 507 pass the confirmation 521 to the configuration arbiter block 502. The configuration arbiter block 502, having retained information about the requester of the latest configuration write, sends confirmation 531 to SSIC controller 532 (after translating or reformatting it if needed). This concludes the instant interaction of SSIC controller 532 with configuration arbiter block 502; SSIC controller 532 may now interact directly with the newly-configured physical layer to communicate with other components, chips, boards, or devices. As the command queues are now empty, the configuration arbiter 502 may go into a suspended state such as IDLE, optionally gating its power connection, to wait for the next configuration access.

Figure 6:
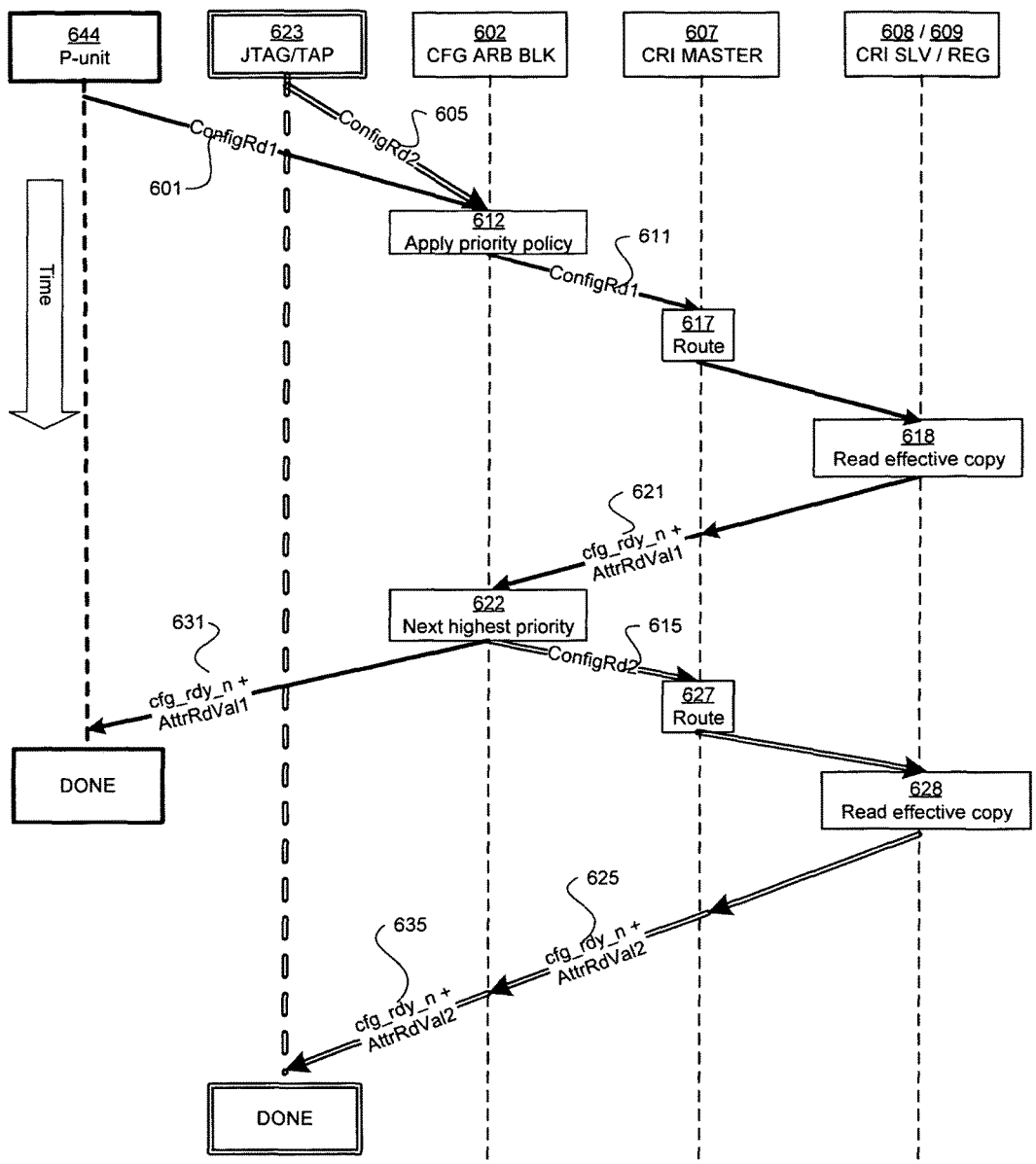
FIG. 6 is a message-flow diagram for a configuration-read arbitration.

FIG. 6 is a message-flow diagram for a configuration-read arbitration. In this example, the arbitration is between access requests from JTAG/TAP controller 623 and P-unit 644. Messages originating in the JTAG/TAP controller 623 are attached to double-line arrows with reference numbers ending in 5. Messages originating in the P-unit 644 are attached to single-line arrows with reference numbers ending in 1. Time for the message flow sequences increases from the top to the bottom or the page, but is not purported to be scaled or uniform.

Beginning at the earliest time at the top of the page: A P-unit request 601 for configuration access is sent from the P-unit 644 to the configuration arbiter block 602. P-unit request 601 includes one configuration read, ConfigRd1. A JTAG/TAP request 605 for configuration access is sent from the JTAG/TAP controller 623 to the configuration arbiter block 602. JTAG/TAP request 605 includes one configuration read, ConfigRd2. (Because no writes are being requested, no updates need to be requested; unlike writing, reading does not change any register values). P-unit request 601 and JTAG/TAP request 605 arrive at the configuration arbiter block 602 at approximately the same time.

The configuration arbiter block 602 performs task 612 of applying the relevant priority policies to the incoming requests 601 and 605. In this example, the policy assigns the P-unit request 601 a higher priority than the JTAG/TAP request 605. Accordingly, the configuration arbiter block 602 stores JTAG/TAP request 605 in a command queue (either a generic queue or one assigned exclusively to write-type commands). Storing stalled requests from lower-priority agents in the command queue prevents their loss during the wait for the physical layer to become free.

The P-unit request 601 is granted configuration access first. Accordingly, configuration arbiter block 602 sends the configuration content ConfigRd1 to CRI master 607 as message 611. If P-unit request 601 arrived at configuration arbiter block 602 already in a form executable by CRI master 607 and CRI slave 608, message 611 may be identical to P-unit request 601; if not, message 611 may be a translation or reformatting of P-unit request 601. CRI master 607 reads a destination indicator in message 611 and performs task 617, routing message 611 to the particular CRI slave 608 that handles the corresponding register bank 609. CRI slave 608 performs task 618, reading the effective copy of register bank 609.

The reading task 618 returns a read value, AttrRdVal1. When reading task 618 is complete, the physical layer sends a message 621 including the read value AttrRdVal1 along with a completion confirmation, e.g., cfg_rdy_n, back to CRI slave 608. CRI slave 608 and CRI master 607 pass the message 621 to the configuration arbiter block 602. The configuration arbiter block 602, having retained information about the requester of the latest configuration read, sends message 631 to P-unit 644. If message 621 arrived at configuration arbiter block 602 already in a form readable by P-unit 644, message 631 may be identical to message 621; if not, message 631 may be a translation or reformatting of message 621. This concludes the instant interaction of P-unit 644 with configuration arbiter block 602; P-unit 644 may now interact directly with the newly-configured physical layer to communicate with other components, chips, boards, or devices.

Meanwhile, configuration arbiter block 602 reads all its command queues, checks for any new requests, and performs task 622 of applying its policies to assign priorities. In some embodiments, configuration arbiter block 602 may assign one or more dedicated command queues to each individual agent that may request access—e.g., each agent has a read queue and a write queue, or each agent has a mixed queue for both reads and writes. In this arbitration round, JTAG/TAP request 605 has risen to top priority. As before, configuration arbiter block 602 stores the second-and-lower-priority requests in command queues if they are not already stored, retrieves the top-priority request, namely JTAG/TAP request 605, from the command queue(s) and sends the content (ConfigRd2) to CRI master 607 as message 615 (which may or may not be identical to JTAG/TAP request 605).

CRI master 607 reads a destination indicator in message 615 and performs task 627, routing message 615 to the particular CRI slave 608 that handles the corresponding register bank 609. For simplicity and clarity, this diagram shows only one CRI slave 608 and one register bank 609 handled by the CRI slave 608, but in practice there may be many slaves, each handling many register banks. For example, ConfigRd1 and ConfigRd2 might in some embodiments trigger a reading of different register banks handled by the same CRI slave, or different register banks handled by different CRI slaves). CRI slave 608 performs task 628 (reading the effective copy of register bank 609).

Reading task 628 yields a value, AttrRdVal2. When reading task 628 is complete, the physical layer sends message 625, which includes AttrRdVal2 and a completion confirmation, e.g., cfg_rdy_n, back to CRI slave 608. CRI slave 608 and CRI master 607 pass the message 625 to the configuration arbiter block 602. The configuration arbiter block 602, having retained information about the requester of the latest configuration write, sends message 635 to JTAG/TAP controller 623 (after translating or reformatting it if needed). This concludes the instant interaction of JTAG/TAP controller 623 with configuration arbiter block 602; JTAG/TAP controller 623 may now interact directly with the physical layer to communicate with other components, chips, boards, or devices. As the command queues are now empty, the configuration arbiter 602 may go into a suspended state such as IDLE, optionally gating its power connection, to wait for the next configuration access.

One or more aspects of at least one embodiment may be implemented by representative data stored on a machine-readable medium which represents various logic within the processor, which when read by a machine causes the machine to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

The following examples pertain to further embodiments:

Example 1 includes a system-on-chip comprising a physical-layer interface and a configuration arbiter controller to receive command requests from hardware or software agents to access the physical-layer interface. The configuration controller comprises command logic to manage command requests, control logic to control the command logic, and a first command queue to store the command requests from the hardware or software agents. The system-on-chip further comprising a clock domain unit to manage asynchronous clocking inputs from the hardware or software agents.

In Example 2, the system-on-chip provided in Example 1 includes a clock output from the configuration arbiter controller to the physical layer interface is synchronous with a clock input.

In Example 3, the system-on-chip provided in Example 1 includes control logic that is active during a power-on sequence or a power-off sequence of the system-on-chip.

In Example 4, the system-on-chip provided in Example 1 includes that an input/output register within the configuration arbiter controller comprises a round-robin access policy or a weighted access policy.

In Example 5, the system-on-chip provided in Example 1 includes that an input/output register within the configuration arbiter controller comprises a plurality of associated pairs of requester IDs and corresponding priorities.

In Example 6, the system-on-chip provided in Example 1, wherein a depth of the first command queue is configurable according to a rate of the command requests from the hardware or software agents to access the physical-layer interface.

In Example 7, the system-on-chip provided in Example 1 further comprising a second command queue, wherein the command logic is coupled to the second command queue, the command logic to compare the number of commands in each of the first command queue and the second command queue.

In Example 8, the system-on-chip provided in Example 1, further comprising additional command queues such that the command requests from the hardware or software agents are received by the first command queue or one of the additional command queues.

In Example 9, the system-on-chip of Example 1, wherein the physical-layer interface comprises a plurality of data lanes wherein each data lane comprises a register interface, wherein each register interface is coupled to a lane register or a private register, wherein each register interface comprises a master register interface coupled to a plurality of slave register interfaces; wherein each data lane is coupled to one of the slave register interfaces.

In Example 10, the system-on-chip of claim 9, further comprising a common lane, wherein the master register interface is coupled to the common lane.

Example 11 provides a system comprising a plurality of controllers; a physical-layer interface; and a configuration arbiter controller coupled to the plurality of controllers and to the physical-layer interface. The physical-layer interface comprises a configuration register set. The configuration register set comprises at least one of a lane register or a private register. The at least one register in the configuration register set is writeable by the configuration arbiter controller but not by at least one of the plurality of controllers. The coupling of the configuration arbiter controller to the physical-layer interface comprises a first data link and a first clock interface.

In Example 12, the system of claim 11 includes that the configuration arbiter controller is controlled by a BIOS.

In Example 13, the system of claim 11 includes that the configuration arbiter controller is coupled to a high-speed bus or system fabric.

In Example 14, the system of claim 13 further comprising a P-unit and a power-management integrated circuit coupled to the high-speed bus or system fabric.

In Example 15, the system of claim 11 includes that the first clock interface carries an arbiter clock signal; and wherein the arbiter clock signal has a frequency at least as high as a highest-frequency clock among the plurality of controllers.

In Example 16, the system of claim 15 includes that the messages in the first data link are synchronized to the arbiter clock signal; and wherein a clock for at least one of the plurality of controllers is not synchronized to the arbiter clock signal.

Example 17 includes a method, comprising: coupling a plurality of controllers to a configuration arbiter; reading at least one command from a command queue; coupling the configuration arbiter to a configuration register in a physical layer; writing the at least one command to the command queue; and executing the at least one command by state machine logic. The writes to the configuration register configure the physical layer for use by one of the plurality of controllers. At least two of the plurality of controllers use non-identical configurations of the physical layer.

In Example 18, the method of claim 17 further comprising: associating a requester ID with each of a plurality of command queues. The requester ID is unique to at least one of the plurality of controllers.

In Example 19, the method of claim 17 includes that the writes to the configuration register are executed as a batch and the reads of the configuration register are serialized.

In Example 20, the method of claim 17 further comprising flushing the command queue and transitioning to an idle state in response to a power-down of the physical layer.

The preceding Description and accompanying Drawings describe examples of embodiments in some detail to aid understanding. However, the scope of protection may also include equivalents, permutations, and combinations that are not explicitly described herein. Only the claims appended here (along with those of parent, child, or divisional patents, if any) define the limits of the protected intellectual-property rights.

We claim:

1. A system-on-chip, comprising:
    a physical-layer interface;
    a configuration arbiter controller to receive command requests from hardware and software agents to access the physical-layer interface;
    wherein the configuration arbiter controller comprises:
        command logic to manage command requests;
        control logic to control the command logic;
        a first command queue to store the command requests from the hardware and software agents; and
        a plurality of clock domain units to manage asynchronous clocking inputs from the hardware and software agents based on a predefined priority associated with respective ones of the hardware and software agents, wherein a first clock domain unit of the plurality of clock domain units receives a first signal from a first hardware or software agent, a second clock domain unit of the plurality of clock domain units receives a second signal from a second hardware or software agent, and the first signal is clocked differently from the second signal.

2. The system-on-chip of claim 1, wherein a clock output from the configuration arbiter controller to the physical-layer interface is synchronous with a clock input.

3. The system-on-chip of claim 1, wherein the control logic is active during a power-on sequence or a power-off sequence of the system-on-chip.

4. The system-on-chip of claim 1, wherein a depth of the first command queue is configurable according to a rate of the command requests from the hardware or software agents to access the physical-layer interface.

5. The system-on-chip of claim 1, further comprising a second command queue, wherein the command logic is coupled to the second command queue, the command logic to compare a number of commands in each of the first command queue and the second command queue.

6. The system-on-chip of claim 1, further comprising additional command queues such that the command requests from the hardware and software agents are received by the first command queue or one of the additional command queues.

7. The system-on-chip of claim 1, wherein the physical-layer interface comprises;
    a plurality of data lanes, wherein each data lane comprises a register interface;
    wherein each register interface is coupled to a lane register or a private register;
    wherein each register interface comprises a master register interface coupled to a plurality of slave register interfaces;
    wherein each data lane is coupled to one of the slave register interfaces.

8. The system-on-chip of claim 7 further comprising a common lane, wherein the master register interface is coupled to the common lane.

* * * * *